(12) United States Patent
Pan

(10) Patent No.: US 10,445,392 B2
(45) Date of Patent: Oct. 15, 2019

(54) OFFICIAL ACCOUNT QUICK RESPONSE CODE GENERATION METHOD AND SERVER, OFFICIAL ACCOUNT FOLLOWING METHOD AND SERVER, AND TERMINAL

(71) Applicant: Tencent Technology (Shenzhen) Company Limited, Shenzhen (CN)

(72) Inventor: Linfeng Pan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 54 days.

(21) Appl. No.: 15/690,049

(22) Filed: Aug. 29, 2017

(65) Prior Publication Data

US 2017/0357726 A1 Dec. 14, 2017

Related U.S. Application Data

(63) Continuation-in-part of application No. PCT/CN2016/083650, filed on May 27, 2016.

(30) Foreign Application Priority Data

Nov. 17, 2015 (CN) .......................... 2015 1 0797276

(51) Int. Cl.
*G06F 16/955* (2019.01)
*G06K 7/14* (2006.01)
(Continued)

(52) U.S. Cl.
CPC ....... *G06F 16/9554* (2019.01); *G06K 7/1417* (2013.01); *G06K 19/06037* (2013.01);
(Continued)

(58) Field of Classification Search
USPC ......................................................... 235/375
See application file for complete search history.

(56) References Cited

U.S. PATENT DOCUMENTS 8,566,425 B1 * 10/2013 Srinivasaiah .......... G06Q 50/00
707/728
2012/0303430 A1 * 11/2012 Tiku ................... G06Q 30/0207
705/14.17
(Continued)

FOREIGN PATENT DOCUMENTS

CN 103870488 A 6/2014
CN 104184655 A 12/2014
(Continued)

OTHER PUBLICATIONS

Tencent Technology, Written Opinion, PCT/CN2016/083650, dated Jul. 27, 2016, 7 pgs.
(Continued)

*Primary Examiner* — Michael G Lee
*Assistant Examiner* — David Tardif
(74) *Attorney, Agent, or Firm* — Morgan, Lewis & Bockius LLP

(57) ABSTRACT

The present disclosure relates to an official account quick response code generation method performed at a computer server, the method comprising: obtaining an association request, the association request comprising an operator identifier, an official account list, and authorization information of multiple official accounts in the official account list; obtaining description information corresponding to each official account from a corresponding official account server according to the authorization information of the official account; associatively storing the operator identifier, the official accounts, and the corresponding description information; obtaining a quick response code generation request, the quick response code generation request carrying the
(Continued)

operator identifier and at least one to-be-promoted official account in the official account list; and generating a promotion link corresponding to the operator identifier according to the quick response code generation request, and converting the promotion link into a quick response code.

14 Claims, 9 Drawing Sheets

(51) Int. Cl.
*H04L 29/06* (2006.01)
*G06K 19/06* (2006.01)
*G06K 19/14* (2006.01)
*G06Q 30/00* (2012.01)
*H04L 12/58* (2006.01)

(52) U.S. Cl.
CPC ............ *G06K 19/14* (2013.01); *G06Q 30/00* (2013.01); *H04L 29/06* (2013.01); *H04L 51/046* (2013.01); *H04L 63/0815* (2013.01)

(56) References Cited

U.S. PATENT DOCUMENTS

| | | | |
|---|---|---|---|
| 2013/0181045 A1* | 7/2013 | Dessert | G06Q 20/322 235/383 |
| 2016/0117487 A1* | 4/2016 | Amacker | G06F 16/955 235/375 |
| 2017/0083921 A1* | 3/2017 | Espinoza | G06Q 30/012 |
| 2018/0247296 A1* | 8/2018 | Win | G06Q 20/3227 |

FOREIGN PATENT DOCUMENTS

| | | |
|---|---|---|
| CN | 104734934 A | 6/2015 |
| CN | 105491008 A | 4/2016 |

OTHER PUBLICATIONS

Tencent Technology, IPRP, PCT/CN2016/083650, dated May 22, 2018, 8 pgs.
Tencent Technology, ISR PCT/CN2016/083650, dated Jul. 27, 2016, 2 pgs.

* cited by examiner

OFFICIAL ACCOUNT QUICK RESPONSE CODE GENERATION METHOD AND SERVER, OFFICIAL ACCOUNT FOLLOWING METHOD AND SERVER, AND TERMINAL

RELATED APPLICATIONS

This application is a continuation-in-part application of PCT/CN2016/083650, entitled "PUBLIC ACCOUNT TWO-DIMENSIONAL CODE GENERATION METHOD AND SERVER, AND PUBLIC ACCOUNT FOLLOWING METHOD, SERVER AND TERMINAL" filed on May 27, 2016, which claims priority to Chinese Patent Application No. 201510797276.1, filed with the State Intellectual Property Office of the People's Republic of China on Nov. 17, 2015, and entitled "PUBLIC ACCOUNT TWO-DIMENSIONAL CODE GENERATION METHOD AND SERVER, AND PUBLIC ACCOUNT FOLLOWING METHOD, SERVER AND TERMINAL", both of which are incorporated herein by reference in their entirety.

FIELD OF THE TECHNOLOGY

The present disclosure relates to the field of instant messaging, and in particular, to an official account quick response code generation method and server, an official account subscription method and server, and a terminal.

BACKGROUND OF THE DISCLOSURE

With the development of the instant messaging technology, an official account is favored by increasing operators for its strong information promotion capability. Furthermore, public platforms providing the official account become more. An operator may have applied for an official account on different public platforms, and has multiple different official accounts on a same public platform.

Currently, to simplify a subscription operation of the people on the official account, subscription is usually performed on the official account by means of scanning a quick response code of the official account.

Therefore, based on the case in which the operator has multiple official accounts, a method for promoting and subscribing to an official account by using a quick response code has the following two problems:

First, each official account needs to separately generate a quick response code, and consequently, the operator needs to promote multiple quick response codes, and promotion costs are increased.

Second, currently, the quick response code of the official account is generated by the public platform that provides the official account, and needs to be scanned by an application (APP) corresponding to the platform so as to fluently guide subscription. When the operator provides quick response codes of different public platforms, usually it is difficult for the user to know which scanning software is used to scan the quick response codes, which greatly increasing operation costs of subscribing to the official account.

SUMMARY

According to various embodiments of this application, an official account quick response code generation method and server, an official account subscription method and server, and a terminal, and another official account subscription method are provided.

An official account quick response code generation method includes:

obtaining an association request, the association request including an operator identifier, an official account list, and authorization information of multiple official accounts in the official account list;

obtaining description information corresponding to each official account from a corresponding official account server according to the authorization information of the official account;

associatively storing the operator identifier, the official accounts, and the corresponding description information;

obtaining a quick response code generation request, the quick response code generation request carrying the operator identifier and at least one to-be-promoted official account in the official account list; and generating a promotion link corresponding to the operator identifier according to the quick response code generation request, and converting the promotion link into a quick response code.

A server includes a memory and a processor, the memory stores an instruction, and when executed by the processor, the instruction causes the processor to perform the following steps:

obtaining an association request, the association request including an operator identifier, an official account list, and authorization information of multiple official accounts in the official account list;

obtaining description information corresponding to each official account from a corresponding official account server according to the authorization information of the official account;

associatively storing the operator identifier, the official accounts, and the corresponding description information;

obtaining a quick response code generation request, the quick response code generation request carrying the operator identifier and at least one to-be-promoted official account in the official account list; and generating a promotion link corresponding to the operator identifier according to the quick response code generation request, and converting the promotion link into a quick response code.

An official account subscription method includes:

obtaining an official account subscription request from a terminal by scanning and parsing the quick response code;

finding a corresponding operator identifier and at least one to-be-promoted official account associated with the operator identifier, and returning a subscription user interface including the at least one to-be-promoted official account to the terminal; and obtaining a user selection of the at least one-to-be-promoted official account through the subscription user interface, and submitting a user subscription request of the user-selected official account to a corresponding official account server.

A server includes a memory and a processor, the memory stores an instruction, and when executed by the processor, the instruction causes the processor to perform the following steps:

obtaining an official account subscription request from a terminal by scanning and parsing the quick response code;

finding a corresponding operator identifier and at least one to-be-promoted official account associated with the operator identifier, and returning a subscription user interface including the at least one to-be-promoted official account to the terminal; and obtaining a user selection of the at least one-to-be-promoted official account through the subscription user interface, and submitting a user subscription request of the user-selected official account to a corresponding official account server.

An official account subscription method includes:

obtaining, by a unified official account server, a promotion link sent by a terminal, the promotion link being obtained by the terminal by scanning and parsing a quick response code;

finding, by the unified official account server, a corresponding operator identifier and at least one to-be-promoted official account according to the promotion link, and returning a subscription user interface including the at least one to-be-promoted official account to the terminal; and performing, by an official account server, a subscription operation according to an official account selected by the terminal from the subscription user interface.

A terminal includes a memory and a processor, the memory stores an instruction, and when executed by the processor, the instruction causes the processor to perform the following steps:

scanning a quick response code, and parsing the scanned quick response code to obtain a promotion link;

sending the promotion link to a unified official account server, so that the unified official account server finds a corresponding operator identifier and at least one to-be-promoted official account according to the promotion link;

displaying a subscription user interface of the at least one to-be-promoted official account returned by the unified official account server; and obtaining an official account selected from the subscription user interface, and sending the user-selected official account to a target official account server, so that the target official account server grants subscription by the user-selected official account.

Details of one or more embodiments of the present disclosure are provided in the following accompanying drawings and descriptions. Other features, objectives, and advantages of the present disclosure are obvious in this specification, the accompanying drawings, and the claims.

BRIEF DESCRIPTION OF THE DRAWINGS

To describe the technical solutions in the embodiments of the present invention or in the existing technologies more clearly, the following briefly describes the accompanying drawings required for describing the embodiments or the existing technologies. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the embodiments herein are provided for describing the present disclosure and not intended to limit the present disclosure.

Figure 1:
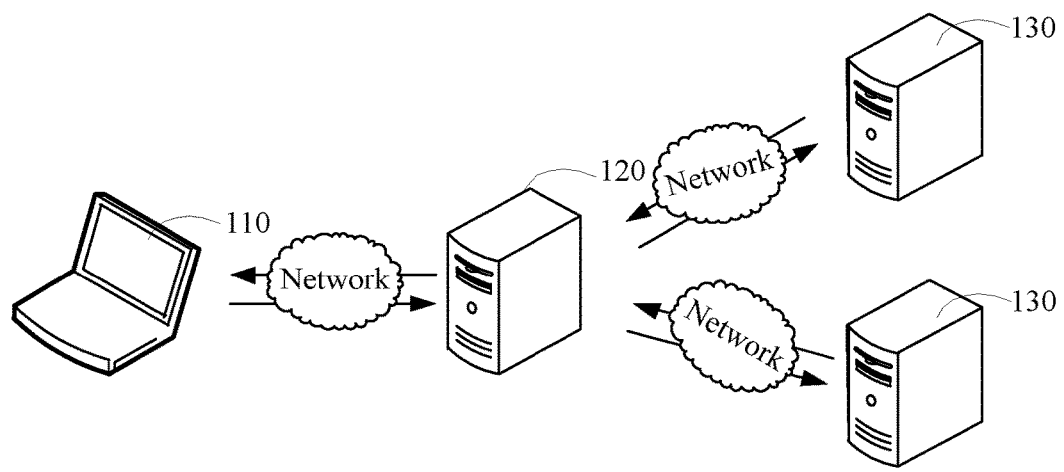
FIG. 1 is a diagram of an application environment of an official account quick response code generation method according to an embodiment.

An official account quick response code generation method provided in an embodiment of the present invention may be applied to an application environment shown in FIG. 1. As shown in FIG. 1, a terminal 110 communicates with a unified official account server 120 by using a network, and the unified official account server 120 communicates with an official account server 130 by using the network. The terminal 110 may be provided with various applications and run the various applications. The terminal 110 generates an association request by using an application and sends the association request to the unified official account server 120 by using the network. The unified official account server 120 obtains, according to authorization information of an official account carried in the association request, description information corresponding to the official account from a corresponding official account server 130, and associatively stores an operator identifier and the official account carried in the association request, and the obtained corresponding description information. It should be noted that the official account may be multiple official accounts on different public platforms, and therefore, there may be multiple official account servers 130. The unified official account server 120 separately obtains the description information of the official account from the official account server of a public platform corresponding to the official account. Further, the terminal 110 generates a quick response code generation request by using the application, and sends the quick response code generation request to the unified official account server 120 by using the network. The quick response code generation request carries the operator identifier and at least one to-be-promoted official account in the official account list, and the unified official account server 120 generates a promotion link corresponding to the operator identifier according to the quick response code generation request, and generates a quick response code according to the promotion link.

Figure 2:
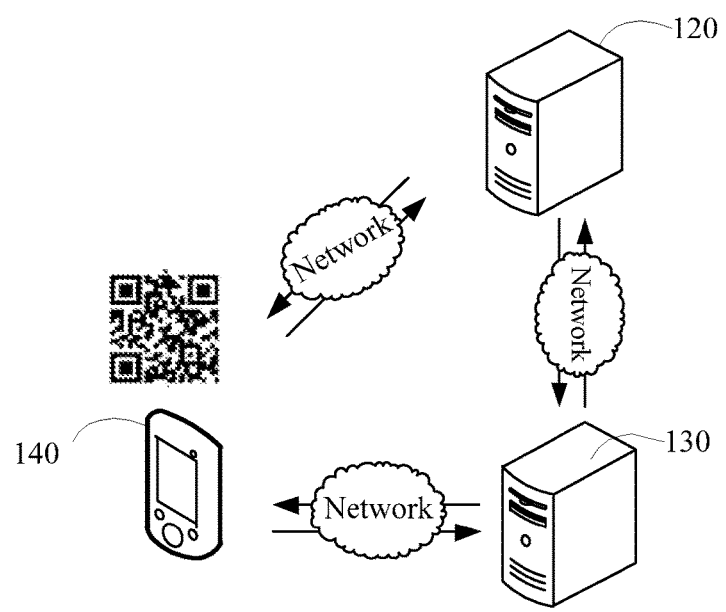
FIG. 2 is a diagram of an application environment of an official account subscription method according to an embodiment.

An official account subscription method provided in an embodiment of the present invention may be applied to an application environment shown in FIG. 2. As shown in FIG. 2, a terminal 140 communicates with a unified official account server 120 and an official account server 130 by using a network. The unified official account server 120 communicates with the official account server 130 by using the network. The terminal 140 is provided with a quick response code scanning tool. The terminal 140 obtains a promotion link by scanning and parsing a quick response code by using a quick response code scanning tool, and sends the promotion link to the unified official account server 120 by using the network. The unified official account server 120 finds a corresponding operator identifier and at least one to-be-promoted official account according to the promotion link, and returns a subscription user interface of the at least one to-be-promoted official account to the terminal 140. A user selects an official account from the subscription user interface, and the user-selected official account is an official account that the user intends to subscribe to. The subscription user interface jumps, according to the user-selected official account, to an authorization page provided by the corresponding official account server 130, and guides login and authorization of the user. After the user performs the log-in and confirms the authorization, the unified official account server 120 obtains user authorization information and sends the user-selected official account and the user authorization information to the official account server 130, and the official account server 130 performs a subscription operation on the user-selected official account according to the user authorization information. It should be noted that after the user performs the log-in and confirms the authorization, the terminal 140 may directly send the obtained user authorization information and information about the selected to-be-subscribed official account to the official account server 130, and the official account server 130 performs the subscription operation on the user-selected official account according to the obtained user authorization information.

Figure 3:
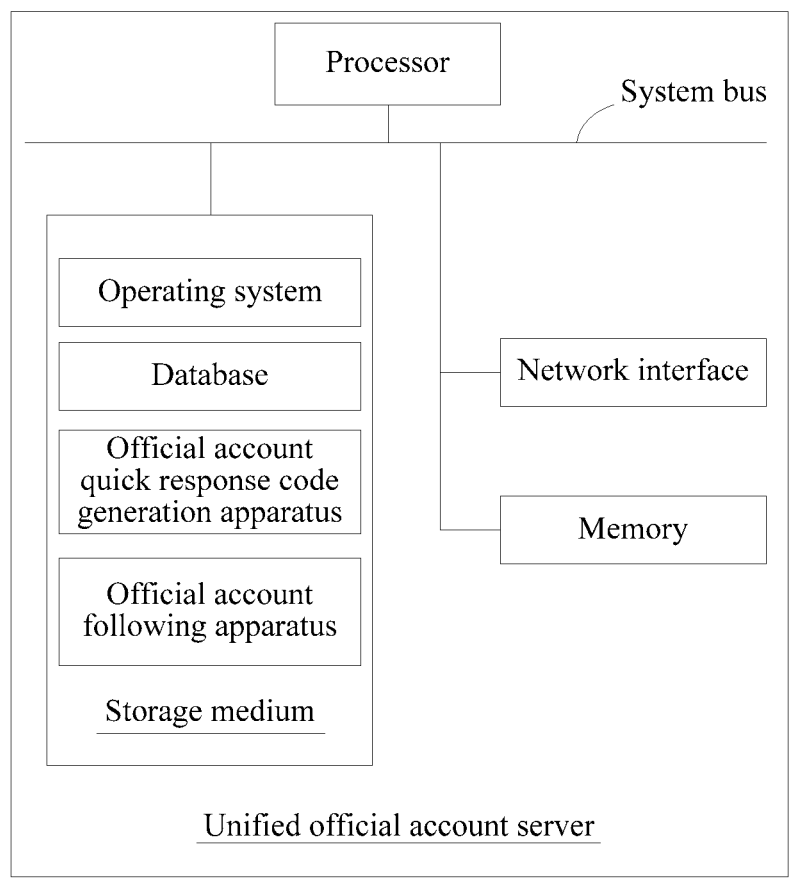
FIG. 3 is a schematic diagram of an internal structure of a unified official account server according to an embodiment.

FIG. 3 is a schematic diagram of an internal structure of a unified official account server 120 according to an embodiment. The server includes a processor, a storage medium, a memory, and a network interface that are connected by using a system bus. The storage medium of the server has an operating system, a database, a quick response code generation apparatus, and an official account subscription apparatus. The database is used for storing data, such as storing an operator identifier, an official account, and corresponding description information, and association relationships between the three. The quick response code generation apparatus is configured to implement a quick response code generation method, and the official account subscription apparatus is configured to implement an official account subscription method. The processor of the unified official account server is configured to provide computing and controlling capabilities, to support running of the entire server. The memory of the unified official account server provides an environment for running of an identity verification apparatus and the official account subscription apparatus in the storage medium. The network interface of the unified official account server is configured to connect to and communicate with an external terminal or server by using a network, for example, obtain a promotion link obtained by a terminal 140 by scanning and parsing a quick response code and return a subscription user interface to the terminal 140.

Figure 4:
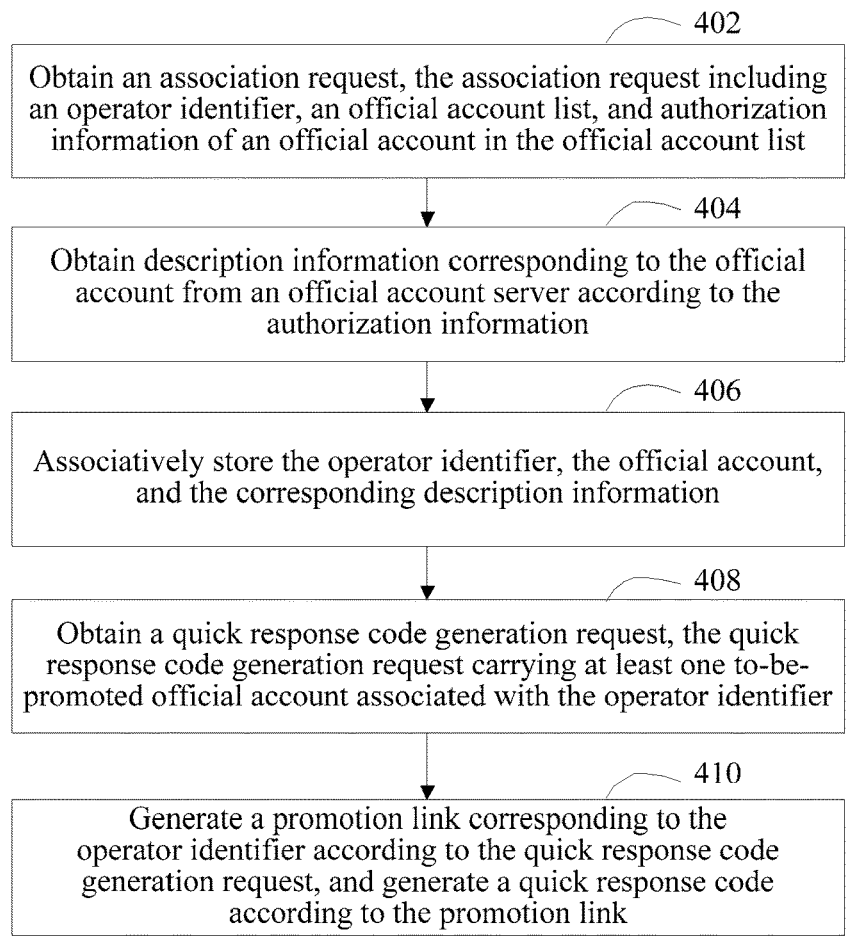
FIG. 4 is a flowchart of an official account quick response code generation method according to an embodiment.

As shown in FIG. 4, in an embodiment, an official account quick response code generation method is provided. A description is provided by using an example in which the method is applied to a unified official account server 120 and specifically includes the following steps:

Step 402: Obtain an association request, the association request including an operator identifier, an official account list, and authorization information of multiple official accounts in the official account list.

An operator refers to an individual or a team who applies for an official account on a public platform, and manages and operates the official account applied by the individual or the team. The official account refers to an application account on a platform. The official account can implement word, image, voice, and video communication with a particular group on the platform, and may be, for example, a public service account on a social platform, or may be a service account and the like on some third-party payment platform.

In this embodiment, the operator applies the unified official account server for an operator identifier by using a terminal. The unified official account server allocates a unique identifier to the operator, such as "ID_0001". The operator identifier is used for uniquely identifying an official account of the operator and related configuration information. Further, the operator may set a password for the operator identifier and protect security of the operator identifier.

The operator sends the association request to the unified official account server by using the terminal, and the unified official account server obtains the operator identifier, the official account list, and the authorization information of the official account in the official account list included in the association request. The official account list includes a to-be-associated official account. Further, the to-be-associated official account in the official account list may be one or more official accounts on a same public platform, or may be multiple official accounts on different public platforms. For example, the operator identifier is ID_0001, and to-be-associated official accounts in the official account list are respectively official accounts "A_001", "A_002", and "A_003" on a public platform A, and official accounts "B_001" and "B_002" on a public platform B.

Step 404: Obtain description information corresponding to the official account from an official account server according to the authorization information.

In this embodiment, the unified official account server requests the official account server for the description information corresponding to the official account according to the obtained authorization information of the official account, and the official account server returns the description information corresponding to the official account to the unified official account server according to the authorization information of the official account. Further, the description information corresponding to the official account includes an official account name, an official account profile photo, and content description information of the official account.

It may be understood that the official account server refers to a server corresponding to each public platform that manages the official account. Different public platforms correspond to different official account servers.

Step 406: Associatively store the operator identifier, the official account, and the corresponding description information.

After receiving the description information corresponding to the official account returned by the official account server, the unified official account server associatively stores the operator identifier, the official account, and the description information corresponding to the obtained official account.

Step 408: Obtain a quick response code generation request, the quick response code generation request carrying the operator identifier and at least one to-be-promoted official account in the official account list.

In this embodiment, the operator selects at least one official account from the official accounts associated with the operator identifier, where the user-selected official account is the to-be-promoted official account, and sends the quick response code generation request to the unified official account server by using the terminal. It may be understood that the quick response code generation request carries the operator identifier and at least one to-be-promoted official account in the official account list. The unified official account server obtains the operator identifier and at least one to-be-promoted official account in the official account list carried in the quick response code generation request that is sent by the terminal.

Further, there may be one or more to-be-promoted official accounts. The to-be-promoted official account may be multiple official accounts on a same public platform, or may be multiple official accounts on different platforms. Further, the unified official account server establishes an association relationship between each official account and a corresponding public platform.

The step is described with reference to the example in step 402. The to-be-promoted official account is selected from the official accounts already associated with the operator identifier ID_0001, which are the official accounts "A_001", "A_002", and "A_003" on the public platform A, and the official accounts "B_001" and "B_002" on the public platform B. Further, the to-be-promoted official account may be one official account on the public platform A, such as the official account "A_001", or may be multiple official accounts on the public platform A, such as the official accounts "A_001" and "A_002". Further, the to-be-promoted official account may be the official account in the public platform A and the official account in the public platform B, such as official accounts "A_001", "B_001", and "B_002".

Step 410: Generate a promotion link corresponding to the operator identifier according to the quick response code generation request, and generate a quick response code according to the promotion link.

In this embodiment, after receiving the quick response code generation request sent by the terminal, the unified official account server generates the promotion link corresponding to the operator identifier according to the quick response code generation request. The promotion link can uniquely correspond to the to-be-promoted official account associated with the operator identifier. This is described with reference to the example in step 408: If the to-be-promoted official accounts are respectively "A_001", "B_001", and "B_002", the unified official account server may find corresponding to-be-promoted official accounts "A_001", "B_001", and "B_002" associated with the operator identifier "ID_0001" according to the promotion link.

Specifically, after obtaining the to-be-promoted official accounts, the unified official account server aggregates the to-be-promoted official accounts to generate one piece of configuration. The be-promoted official accounts are associated with the operator identifier, and therefore, the configuration generated by means of aggregation also corresponds to the operator identifier. Then, the unified official account server generates the promotion link corresponding to the operator identifier, where the promotion link can uniquely correspond to the configuration corresponding to the operator identifier according to a correspondence between the configuration and the operator identifier, and finds the to-be-promoted official accounts from the configuration. Therefore, it may be understood that the to-be-promoted official accounts included in the configuration does not change the promotion link.

Further, the promotion link may be in the URL link form of HTTP, for example, http://www.example.com/pubaccs/id_0001/230a170jH39. It should be understood that a specific form of the promotion link is not limited, as long as the to-be-promoted official accounts associated with the operator identifier can be uniquely corresponded to.

In this embodiment, after generating the promotion link corresponding to the operator identifier according to the quick response code generation request, the unified official account server further generates a quick response code according to the promotion link.

In this embodiment, an operator identifier, an official account list, and authorization information of multiple official accounts in the official account list that are carried in an association request are obtained, description information corresponding to the official account is obtained from an official account server according to the authorization information, and the operator identifier, the official account, and the corresponding description information are associatively stored. Then, at least one to-be-promoted official account which is selected from the official account associated with the operator identifier carried in the quick response code generation request is obtained, a promotion link corresponding to the operator identifier is generated according to the quick response code generation request, and a quick response code is generated according to the promotion link. Therefore, multiple to-be-promoted official accounts generate a unified quick response code, so as to resolve the problem that a single official account needs to generate a separate quick response code, thereby reducing promotion costs.

In an embodiment, the official account quick response code generation method further includes a step of extracting the description information of each official account from the corresponding official account server according to the authorization information of the official account and a predefined schedule, so as to update the stored description information of the official account.

In this embodiment, management of the official account is mainly implemented by the official account server, and when the description information of the official account in the official account server changes, description information of the corresponding official account stored in the unified official account server also needs to be updated. Therefore, it may be set that the description information of the official account is extracted from the official account server according to the authorization information of the official account within the preset time period, and the description information of the official account stored in the unified official account server is updated, so that the description information of the official account in the unified official account server is consistent with the description information of the official account in the official account server.

In an embodiment, the official account quick response code generation method further includes steps of: obtaining an official account updating request, and updating, according to the official account updating request, the operator identifier and at least one to-be-promoted official account in the official account list corresponding to the promotion link.

In an embodiment, the unified official account server obtains the official account updating request sent by the terminal, and the official account updating request may be a request of adding or deleting the to-be-promoted official account. The unified official account server selects a corresponding official account from the official account associated with the operator identifier according to the official account updating request, so as to add the to-be-promoted official account or cancel selection on the to-be-promoted official account that is already selected, so that the official account is not a to-be-promoted official account, and the operator identifier and at least one to-be-promoted official account in the official account list corresponding to the promotion link is updated.

With reference to the description of step 410, it may be understood that adding or deleting of the to-be-promoted official account does not change the promotion link. When the to-be-promoted official account updates, configuration corresponding to the operator identifier is corresponded to by using the promotion link, and an updated to-be-promoted official account may be found from the configuration.

In this embodiment, the operator does not change the promotion link while modifying a to-be-promoted official account list, so that the promotion link is still valid, and promotion costs are greatly reduced.

Figure 5:
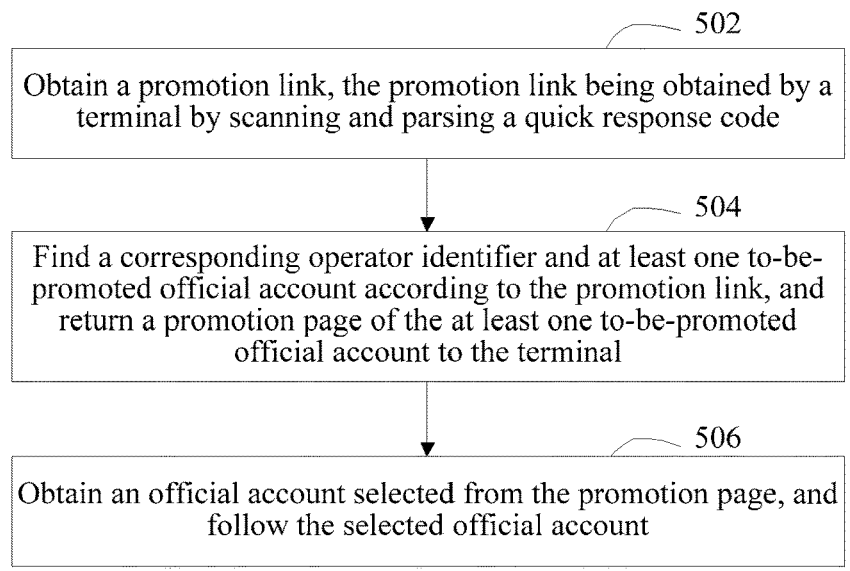
FIG. 5 is a flowchart of an official account subscription method according to an embodiment.

As shown in FIG. 5, in an embodiment, an official account subscription method is provided. A description is provided by using an example in which the method is applied to a unified official account server 120 and specifically includes the following steps:

Step 502: Obtain a promotion link, the promotion link being obtained by a terminal by scanning and parsing a quick response code.

In this embodiment, a user that needs to subscribe to an official account scans, by using a terminal, a quick response code generated by a unified official account server. The terminal obtains a promotion link by parsing the quick response code and sends the promotion link to the unified official account server, and the unified official account server obtains the promotion link.

It should be noted that a tool used by the terminal for scanning the quick response code may be software that has a quick response code scanning function. Alternatively, scanning may be performed by using a scanning tool in a client of a public platform corresponding to the to-be-subscribed official account, or by using a scanning tool provided in another public platform that is not corresponding to the to-be-subscribed official account. A specific quick response code scanning tool is not limited herein.

Step 504: Find a corresponding operator identifier and at least one to-be-promoted official account according to the promotion link, and return a subscription user interface of the at least one to-be-promoted official account to the terminal.

Figure 6:
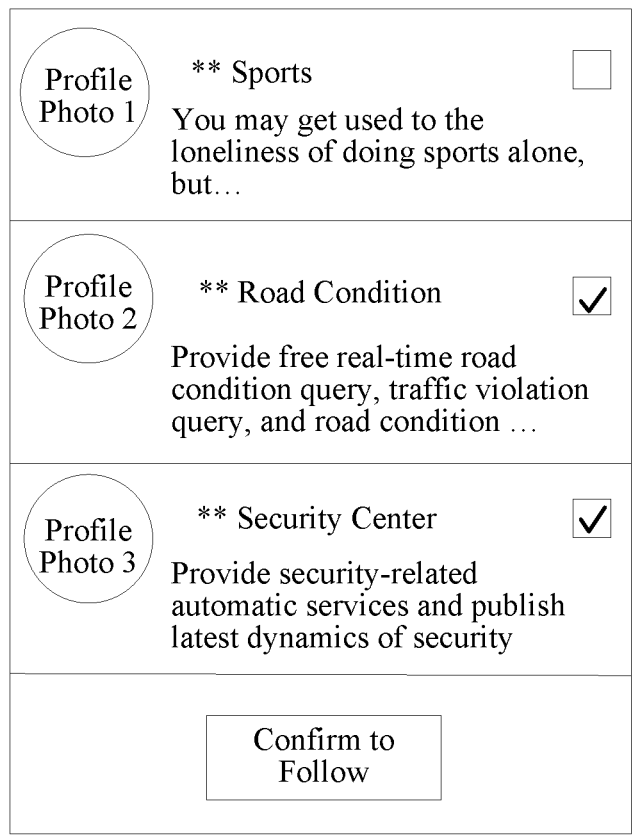
FIG. 6 is a schematic diagram of a subscription user interface according to an embodiment.

In this embodiment, the unified official account server obtains the promotion link, and the promotion link has a correspondence with the operator identifier and can uniquely correspond to the operator identifier and at least one to-be-promoted official account in the official account list. The unified official account server finds a corresponding operator identifier and the at least one to-be-promoted official account according to the promotion link, and returns the subscription user interface of the at least one to-be-promoted official account to the terminal. Further, the subscription user interface includes information about the to-be-promoted official account, such as an official account profile photo, an official account name, and description information of the official account. Further, the to-be-promoted official account on the subscription user interface may be one or more official accounts on a same platform, or may be multiple official accounts on different platforms. As shown in FIG. 6, FIG. 6 is a diagram of which a unified official account server returns a subscription user interface of at least one to-be-promoted official account to a terminal according to an embodiment. A user may select, from the subscription user interface, a to-be-subscribed official account and confirm the subscription. It may be understood that the user may click the official account in the subscription user interface and confirm the subscription when proceeding to a next page. This is not limited in this embodiment.

Step 506: Obtain an official account selected from the subscription user interface, and subscribe to the user-selected official account.

In this embodiment, the user may view, from the subscription user interface, which official accounts the user may subscribe to, and select a to-be-subscribed official account from the official accounts. The terminal obtains, from the page, the official account selected by the user, and sends the user-selected official account to the unified official account server. The selected official account is the to-be-subscribed official account. After receiving the selected to-be-subscribed official account, the unified official account server performs a subscription operation on the user-selected official account.

In this embodiment, a corresponding operator identifier and at least one to-be-promoted official account are found according to the promotion link obtained by the terminal by scanning and parsing the quick response code, a subscription user interface of the at least one to-be-promoted official account is returned to the terminal, an official account selected from the subscription user interface is obtained, and the user-selected official account is subscribed to. By scanning only one quick response code, a user can subscribe to multiple official accounts, so that compared with a conventional method in which the user can subscribe to an official account by scanning a separate quick response code of the official account, user operation costs are greatly reduced.

Figure 7:
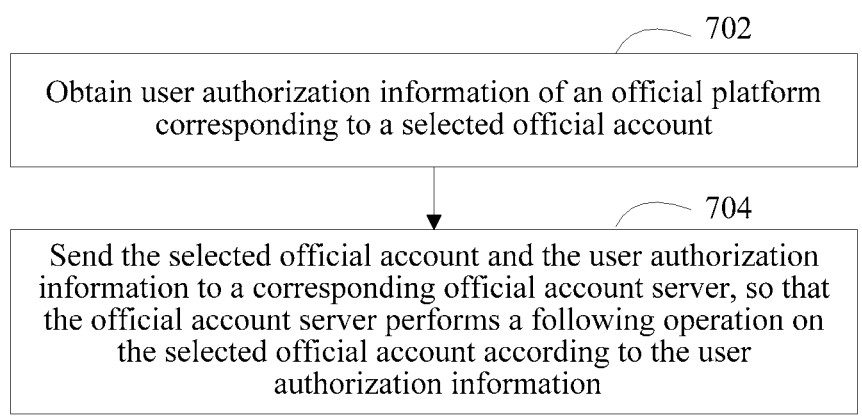
FIG. 7 is a flowchart of subscribing to a user-selected official account according to an embodiment.

In an embodiment, as shown in FIG. 7, steps of subscribing the user-selected official account includes:

Step 702: Obtain user authorization information of a public platform corresponding to a selected official account.

In this embodiment, a unified official account server obtains, in an Open Authorization (OAuth) authorization manner, the user authorization information of the public platform corresponding to the user-selected official account.

The OAuth authorization provides a secure, open, and simple criterion for authorization of user resources, which means that a third party have no access to account information of a user (for example, a user name and a password), that is, the third party may apply for obtaining authorization of the user resources without use of the user name and the password of the user.

Specifically, after the user selects a to-be-subscribed official account from the subscription user interface, the subscription user interface executes an automatic jump, and jumps to an authorization page of the public platform corresponding to the user-selected official account. The authorization page is used for guiding the user to log in and inquiring the user whether to grant a permission of subscribing to the official account to the unified official account server. The jump on the subscription user interface is implemented according to an association relationship between the official account set up in the unified official account server and the corresponding public platform.

Figure 8A:
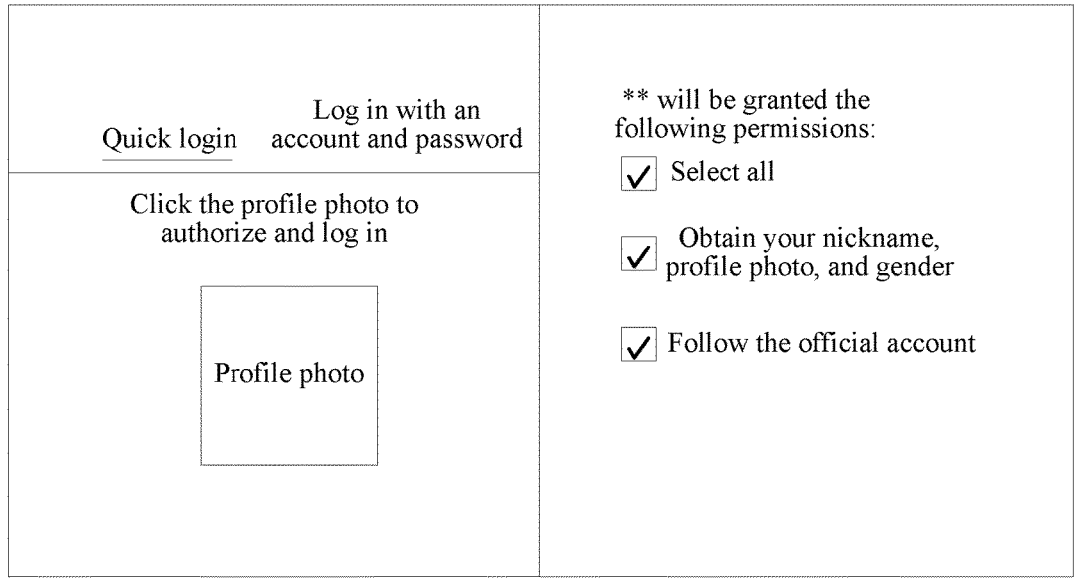
FIGS. 8A and 8B are schematic diagrams of an authorization page according to an embodiment.
Figure 8B:
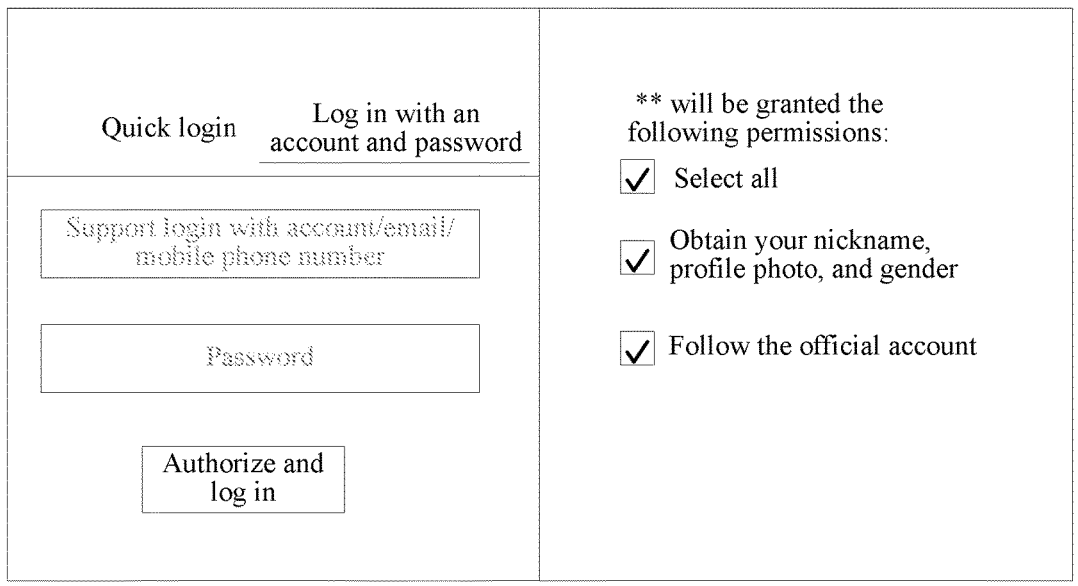

In an embodiment, the step of guiding login and authorization of the user includes: detecting whether locally there is a logged-in user account, if yes, directly displaying user account information and authorization permission information on the authorization page, and making the user to perform an authorization confirmation operation to obtain the user authorization information. It may be understood that the authorization confirmation operation herein means that the user agrees to grant a permission to the event of subscribing to the official account in the name of the detected logged-in user account. Further, the authorization confirmation operation further includes selection of the authorization permission information. That is, the user selects, by using the authorization interface, the authorization permission information that the user permits to authorize, and performs an operation confirming that the user permits the authorization. Specifically, the user may confirm, by clicking "log in" and "authorize", that the user permits the authorization, or may perform the authorization confirmation operation in a simple manner, such as by using a shortcut key. The user does not need to enter the user name and the password again on the authorization page to perform the login and authorization operation and obtain the user authorization information. If locally there is no logged-in user account, the authorization page guides the user to enter the user name and the password, and displays the authorization permission information. After entering the user name and the password, the user can perform the login and authorization operation by clicking "confirm" and obtain the user authorization information. For details, refer to schematic diagrams of authorization pages in FIG. 8A and FIG. 8B. FIG. 8A shows an authorization page that is provided when it is detected that locally there is a logged-in user account. FIG. 8B shows an authorization page that is provided when it is detected that locally there is no logged-in user account.

Further, after the user performs the login and confirms the authorization on the authorization page, the terminal obtains the user authorization information from the authorization page, and sends the user authorization information to the unified official account server together with the user-selected official account.

Step 704: Send the user-selected official account and the user authorization information to a corresponding official account server, so that the official account server performs a subscription operation on the user-selected official account according to the user authorization information.

After obtaining the user authorization information of the public platform corresponding to the user-selected official account, the unified official account server sends the user-selected official account and the user authorization information to the corresponding official account server. The official account server performs the subscription operation on the user-selected official account according to the user authorization information.

Further, the obtained user authorization information has time validity, and when a preset time threshold is exceeded, the obtained user authorization information loses validity.

In this embodiment, in the OAuth authorization manner, the subscription operation is performed on the to-be-subscribed official account by using the obtained user authorization information when a third party does not know the user account and the password, thereby improving security.

In an embodiment, the user selection includes multiple user-selected official accounts belonging to a same public platform.

In this embodiment, the user selects multiple official accounts on the unified public platform from the subscription user interface. The obtained user authorization refers to a permission that the unified official account server is authorized to subscribe to the official account, and therefore, for a same public platform, all user-selected official accounts can be subscribed to by using authorization of the user at a time. Steps of performing a subscription operation on multiple official accounts are greatly simplified.

Figure 9:
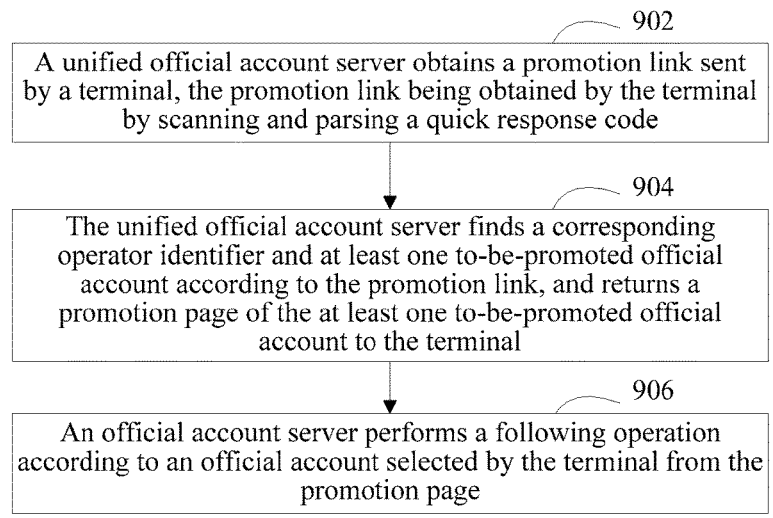
FIG. 9 is a flowchart of an official account subscription method according to another embodiment.

As shown in FIG. 9, in an embodiment, another official account subscription method is provided. A description is provided by using an example in which the method is applied to a unified official account server 120 and an official account server 130, and specifically includes the following steps:

Step 902: A unified official account server obtains a promotion link sent by a terminal, the promotion link being obtained by the terminal by scanning and parsing a quick response code.

Step 904: The unified official account server finds a corresponding operator identifier and at least one to-be-promoted official account according to the promotion link, and returns a subscription user interface of the at least one to-be-promoted official account to the terminal.

In this embodiment, the to-be-promoted official account on the subscription user interface may be one or more official accounts on a same platform, or may be multiple official accounts on different platforms.

Step 906: An official account server performs a subscription operation according to an official account selected by the terminal from the subscription user interface.

In an embodiment, before the performing, by an official account server, a subscription operation according to an official account selected by the terminal from the subscription user interface, the method further includes:

obtaining, by the unified official account server, the official account selected from the subscription user interface and user authorization information of a public platform corresponding to the user-selected official account, and sending the user-selected official account and the user authorization information to an official account server corresponding to the public platform.

In this embodiment, the step of performing, by an official account server, a subscription operation according to an official account selected by the terminal from the subscription user interface includes: performing, by the official account server of the public platform, the subscription operation on the user-selected official account according to the user authorization information.

In another embodiment, the step of performing, by an official account server, a subscription operation according to an official account selected by the terminal from the subscription user interface includes: obtaining, by the official account server of the public platform, the official account selected from the subscription user interface and the user authorization information of the corresponding public platform that are sent by the terminal, and performing the subscription operation on the user-selected official account according to the user authorization information.

Figure 10:
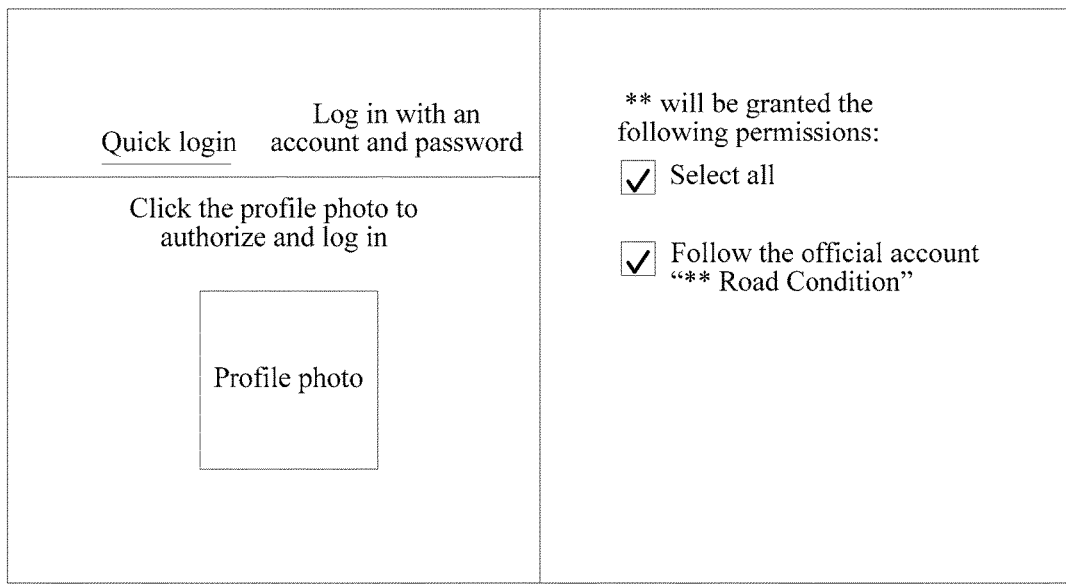
FIG. 10 is a schematic diagram of an authorization page according to another embodiment.

In this embodiment, after a user selects a to-be-subscribed official account from the subscription user interface, the subscription user interface automatically jumps to an authorization page of the public platform corresponding to the user-selected official account. The authorization page is used for guiding login of the user, and directly displays information about the official account subscribed to by the user after authorization. For a specific schematic diagram of the authorization page, refer to FIG. 10, which directly displays a to-be-subscribed official account "**road condition". After the user confirms the login and obtains the user authorization information, the terminal directly sends the official account selected from the subscription user interface, that is the to-be-subscribed official account, and the user authorization information of the corresponding public platform to the official account server, and the official account server performs the subscription operation on the user-selected official account according to the user authorization information. In this embodiment, the operations of performing authorization and subscription are implemented by the official account server, and the user authorization information does not need to be sent to a third party, so as to prevent misuse of the user authorization information by a malicious third party, and improve security.

In an embodiment, multiple official accounts are selected from the subscription user interface, and the selected multiple official accounts belong to a same public platform.

Figure 11:
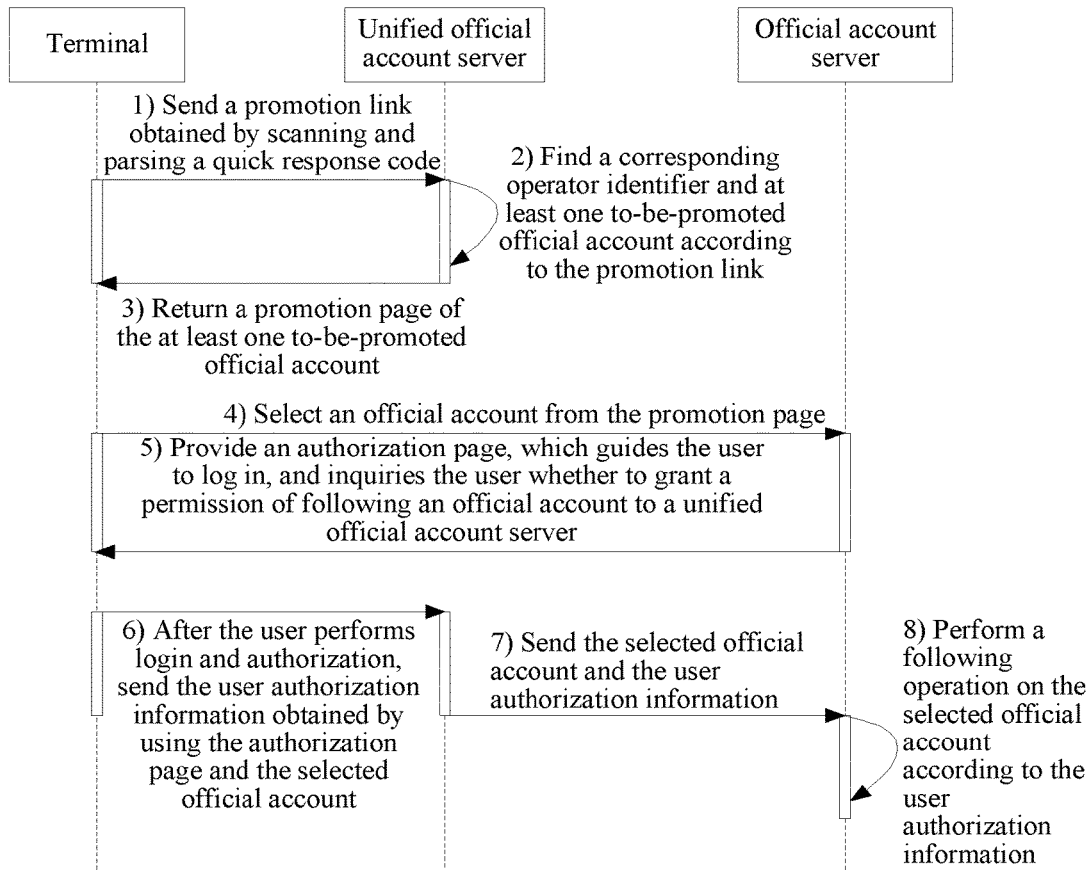
FIG. 11 is a time sequence diagram of an official account subscription method according to an embodiment.

FIG. 11 is a time sequence diagram of an official account subscription method according to an embodiment. In this embodiment, a specific process of the official account subscription method is as follows:

1) A terminal sends a promotion link obtained by the terminal by scanning and parsing a quick response code to a unified official account server.

Specifically, a user obtains the promotion link by using the terminal by scanning the quick response code, and sends the promotion link to the unified official account server.

2) The unified official account server obtains the promotion link, and finds a corresponding operator identifier and at least one to-be-promoted official account according to the promotion link.

3) The unified official account server returns a subscription user interface of the at least one to-be-promoted official account to the terminal.

4) The user selects an official account from the subscription user interface in the terminal, that is, selects the to-be-subscribed official account, and the subscription user interface jumps to an authorization page provided by an official account server of a public platform corresponding to the user-selected official account.

5) The authorization page guides the user to log in, and inquiries the user whether to grant a permission of subscribing to an official account to the unified official account server.

6) After the user performs login and authorization, the terminal sends the user authorization information obtained from the authorization page and the user-selected official account to the unified official account server.

7) The unified official account server sends the obtained selected official account and user authorization information to the official account server.

8) The official account server performs a subscription operation on the user-selected official account according to the user authorization information.

In an embodiment, an official account subscription method is provided. A description is provided by using an example in which the method is applied to a terminal 140 and specifically includes the following steps:

scanning a quick response code, and parsing the scanned quick response code to obtain a promotion link;

sending the promotion link to a unified official account server, so that the unified official account server finds a corresponding operator identifier and at least one to-be-promoted official account according to the promotion link;

displaying a subscription user interface of the at least one to-be-promoted official account returned by the unified official account server; and obtaining an official account selected from the subscription user interface, and user authorization information corresponding to the user-selected official account, and sending the user-selected official account and the user authorization information corresponding to the user-selected official account to a target official account server, so that the target official account server grants subscription by the user-selected official account.

In an embodiment, the target official account server is the unified official account server. In this embodiment, the step of sending the user-selected official account and the user authorization information corresponding to the user-selected official account to a target official account server, so that the target official account server grants subscription by the user-selected official account includes:

sending the user-selected official account and the user authorization information corresponding to the user-selected official account to the unified official account server, so that the unified official account server grants subscription by the user-selected official account.

In an embodiment, the target official account server is an official account server corresponding to a public platform to which the user-selected official account belongs. In this embodiment, the step of sending the user-selected official account and the user authorization information corresponding to the user-selected official account to a target official account server, so that the target official account server grants subscription by the user-selected official account includes:

sending the user-selected official account and the user authorization information corresponding to the user-selected official account to the official account server, so that the official account server grants subscription by the user-selected official account.

In an embodiment, the user selection includes multiple user-selected official accounts belonging to a same public platform.

In an embodiment, the obtaining user authorization information corresponding to the user-selected official account includes:

when detecting that locally there is a logged-in user account on the public platform corresponding to the user-selected official account, displaying an authorization page having information about the detected user account and authorization permission information, obtaining an authorization confirmation operation entered on the authorization page, and obtaining the corresponding user authorization information according to the authorization confirmation operation.

In an embodiment, a server is provided, and an internal structure of the server may correspond to the structure shown in FIG. 3. All of or a part of modules described below may be implemented by using software or hardware, or a combination thereof.

Figure 12:
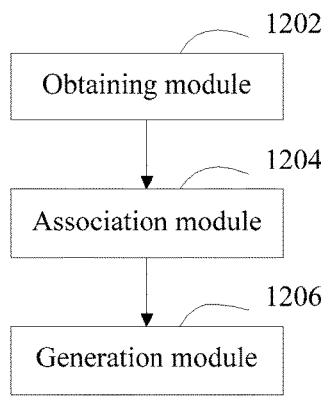
FIG. 12 is a schematic structural diagram of a server according to an embodiment.

In an embodiment, as shown in FIG. 12, the server in this embodiment includes an obtaining module 1202, an association module 1204, and a generation module 1206.

The obtaining module 1202 is configured to obtain an association request, the association request including an operator identifier, an official account list, and authorization information of multiple official accounts in the official account list.

The obtaining module 1202 is further configured to obtain description information corresponding to each official account from a corresponding official account server according to the authorization information of the official account.

The association module 1204 is configured to associatively store the operator identifier, the official account, and the corresponding description information.

The obtaining module 1202 is further configured to obtain a quick response code generation request, the quick response code generation request carrying the operator identifier and at least one to-be-promoted official account in the official account list.

The generation module 1206 is configured to: generate a promotion link corresponding to the operator identifier according to the quick response code generation request, and generate a quick response code according to the promotion link.

Figure 13:
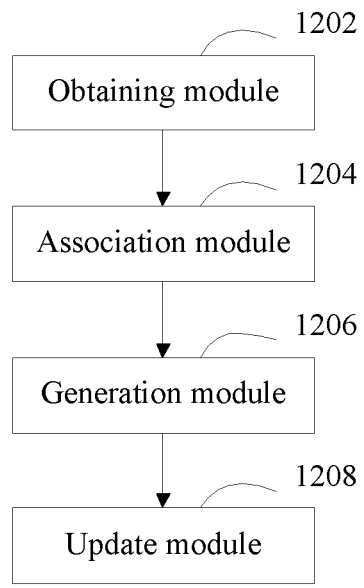
FIG. 13 is a schematic structural diagram of a server according to another embodiment.

As shown in FIG. 13, in an embodiment, the server further includes an update module 1208.

The update module 1208 is configured to extract the description information of the official account from the official account server according to the authorization information of the official account in a preset time period, so as to update the stored description information of the official account.

In an embodiment, the update module 1208 is further configured to: obtain an official account updating request, and update, according to the official account updating request, the operator identifier and at least one to-be-promoted official account in the official account list corresponding to the promotion link.

In an embodiment, the multiple official accounts in the official account list are associated with different public platforms.

In an embodiment, a server is provided, and an internal structure of the server may correspond to the structure shown in FIG. 3. All of or a part of modules described below may be implemented by using software or hardware, or a combination thereof.

Figure 14:
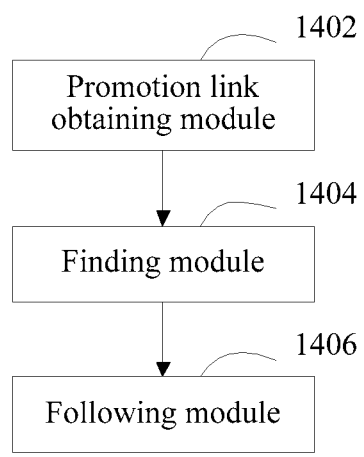
FIG. 14 is a schematic structural diagram of a server according to an embodiment.

In an embodiment, as shown in FIG. 14, the server in this embodiment includes a promotion link obtaining module 1402, a finding module 1404, and a subscription module 1406.

The promotion link obtaining module 1402 is configured to obtain a promotion link, the promotion link being obtained by a terminal by scanning and parsing a quick response code.

The finding module 1404 is configured to: find a corresponding operator identifier and at least one to-be-promoted official account according to the promotion link, and return a subscription user interface of the at least one to-be-promoted official account to the terminal.

The subscription module 1406 is configured to: obtain an official account selected from the subscription user interface, and subscribe to the user-selected official account.

In an embodiment, the subscription module 1406 is further configured to: obtain user authorization information of a public platform corresponding to the user-selected official account; and send the user-selected official account and the user authorization information to a corresponding official account server, so that the official account server performs a subscription operation on the user-selected official account according to the user authorization information.

In an embodiment, the user selection includes multiple user-selected official accounts belonging to a same public platform.

Figure 15:
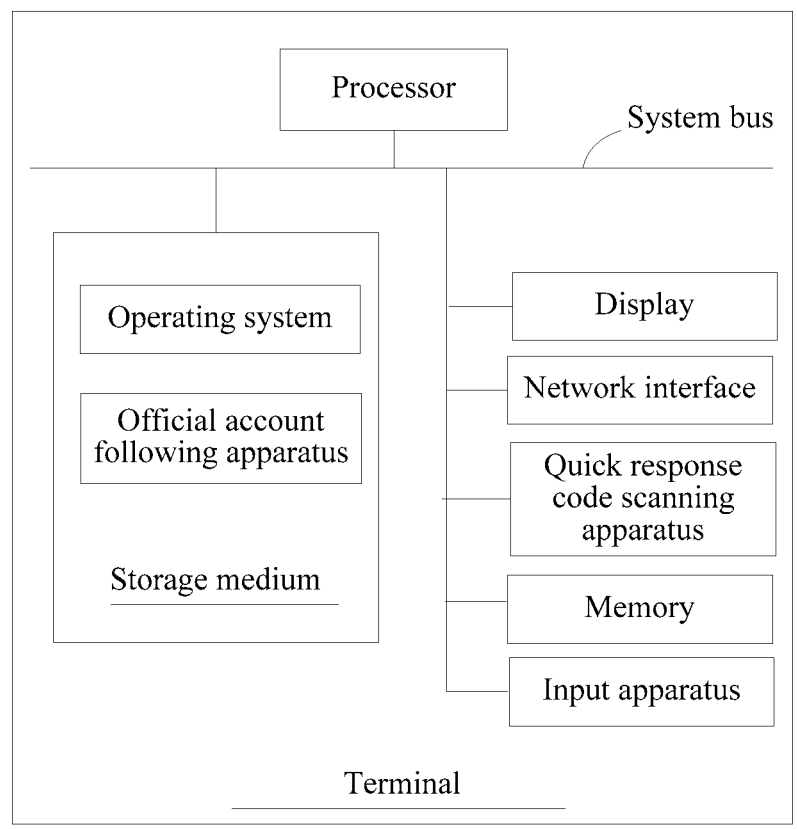
FIG. 15 is a schematic structural diagram of a terminal according to an embodiment.

FIG. 15 is a schematic diagram of an internal structure of a terminal 140 according to an embodiment. The terminal 140 includes a processor, a storage medium, a memory, a network interface, a quick response code scanning apparatus, a display, and an input apparatus that are connected by using a system bus. The storage medium of the terminal stores an operating system, and further includes an official account subscription apparatus. The official account subscription apparatus is configured to implement an official account subscription method. The processor is configured to provide computing and controlling capabilities, to support running of the entire terminal. The memory in the terminal provides an environment for running of the official account subscription apparatus in the storage medium, the network interface is configured to perform network communication with a server, such as send a promotion link obtained by parsing a quick response code to the server, and receive a subscription user interface of at least one to-be-promoted official account returned by the server. The quick response code scanning apparatus of the terminal can scan a quick response code. The display may be a liquid crystal display, an E-ink display, or the like. The input apparatus may be a touch layer covered on the display, or may be a button, a track ball, or a touch pad disposed on an external housing of the terminal, or may be an externally connected keyboard, a touch pad, a mouse or the like. The terminal may be a mobile phone, a tablet computer, or a personal digital assistant. A person skilled in the art may understand that the terminal structure listed in this embodiment is merely a block diagram of a part of the structure related to this application solution, and does not constitute a limitation to the terminal to which this application solution is applied. Specifically, the terminal may include more or less components than the components shown in the figure, or combine some components, or have various component layouts.

In an embodiment, a terminal is provided, and an internal structure of the terminal may correspond to the structure shown in FIG. 15. All of or a part of modules described below may be implemented by using software or hardware, or a combination thereof In an embodiment, the terminal includes: a parsing module, a sending module, a display module, and a subscription processing module.

The parse module is configured to: scan a quick response code, and parse the scanned quick response code to obtain a promotion link.

The sending module is configured to send the promotion link to a unified official account server, so that the unified official account server finds a corresponding operator identifier and at least one to-be-promoted official account according to the promotion link.

The display module is configured to display a subscription user interface of the at least one to-be-promoted official account returned by the unified official account server.

The subscription processing module is configured to: obtain an official account selected from the subscription user interface, and user authorization information corresponding to the user-selected official account, and send the user-selected official account and the user authorization information corresponding to the user-selected official account to a target official account server, so that the target official account server grants subscription by the user-selected official account.

In an embodiment, the target official account server is the unified official account server. In this embodiment, the subscription processing module is further configured to send the user-selected official account and the user authorization information corresponding to the user-selected official account to the unified official account server, so that the unified official account server grants subscription by the user-selected official account.

In an embodiment, the target official account server is an official account server corresponding to a public platform to which the user-selected official account belongs. In this embodiment, the subscription processing module is further configured to send the user-selected official account and the user authorization information corresponding to the user-selected official account to the official account server, so that the official account server grants subscription by the user-selected official account.

In an embodiment, the user selection includes multiple user-selected official accounts belonging to a same public platform.

In an embodiment, the subscription processing module is further configured to: when detecting that locally there is a logged-in user account on the public platform corresponding to the user-selected official account, display an authorization page having information about the detected user account and authorization permission information, obtain an authorization confirmation operation entered on the authorization page, and obtain the corresponding user authorization information according to the authorization confirmation operation.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

Technical features of the foregoing embodiments may be arbitrarily combined. For brevity of description, not all possible combinations of the technical features in the foregoing embodiments are described. However, as long as the combinations of the technical features are not contradicted, the combinations shall be considered as the scope recorded in this specification.

The foregoing embodiments only describe several implementations of the present disclosure, and their description is specific and detailed, but cannot therefore be understood as a limitation to the patent scope of the invention. It should be noted that a person of ordinary skill in the art may further make some variations and improvements without departing from the concept of the present disclosure, and the variations and improvements belong to the protection scope of the present disclosure. Therefore, the protection scope of the present disclosure should be subject to the protection scope of the appended claims.

What is claimed is:

1. An official account quick response code generation method performed at a computer server having one or more processors and memory storing one or more programs to be executed by the one or more processors, comprising:
    obtaining an association request, the association request comprising an operator identifier, an official account list, and authorization information of multiple official accounts in the official account list;
    for each of the multiple official accounts, obtaining corresponding description information from a corresponding official account server according to the authorization information of the official account, wherein the description information includes a name of the official account, a profile photo of the official account, and content description of the official account;
    associatively storing, for each of the multiple official accounts, the operator identifier, the official account, and the corresponding description information;
    receiving a quick response code generation request, the quick response code generation request carrying the operator identifier and multiple to-be-promoted official accounts in the official account list;
    in response to the quick response code generation request:
        generating a promotion link corresponding to the operator identifier, including aggregating the multiple official accounts into the promotion link; and
        converting the promotion link into a quick response code;
    receiving an official account subscription request from a user terminal based on scanning and parsing of the quick response code by the user terminal;
    in response to the subscription request, causing display of a subscription user interface on the user terminal, wherein the user subscription includes the to-be-promoted official accounts and the description information corresponding to each of the to-be-promoted official accounts;
    receiving a user selection of a first one of the to-be-promoted official accounts via the subscription user interface and user authorization information corresponding to the user-selected official account; and
    sending the user-selected official account and the user authorization information to a corresponding official account server, wherein the official account server performs a subscription operation on the user-selected official account according to the user authorization information.

2. The method according to claim 1, further comprising:
    for each of the multiple official accounts, extracting the description information of the official account from the corresponding official account server according to the authorization information of the official account and a predefined schedule, and updating the corresponding description information based on the extracted description information.

3. The method according to claim 1, further comprising:
    obtaining an official account updating request, and updating, according to the official account updating request, the operator identifier and the multiple to-be-promoted official accounts in the official account list corresponding to the promotion link.

4. The method according to claim 1, wherein the multiple official accounts in the official account list are associated with different public platforms.

5. The method according to claim 1, further comprising receiving a user selection of a second one of the to-be-promoted official accounts via the subscription user interface, wherein the first and second to-be-promoted official accounts belong to a same public platform.

6. A computer server, comprising:
    at least one processor;
    memory; and
    one or more program instructions stored in the memory that, when executed by the at least processor, cause the computer server to perform a plurality of operations including:
        obtaining description information corresponding to each official account from a corresponding official account server according to the authorization information of the official account;
        for each of the multiple official accounts, obtaining corresponding description information from a corresponding official account server according to the authorization information of the official account, wherein the description information includes a name of the official account, a profile photo of the official account, and content description of the official account;

associatively storing, for each of the multiple official accounts, the operator identifier, the official account, and the corresponding description information;

receiving a quick response code generation request, the quick response code generation request carrying the operator identifier and multiple to-be-promoted official accounts in the official account list;

in response to the quick response code generation request:
- generating a promotion link corresponding to the operator identifier, including aggregating the multiple official accounts into the promotion link; and
- converting the promotion link into a quick response code;

receiving an official account subscription request from a user terminal based on scanning and parsing of the quick response code by the user terminal;

in response to the subscription request, causing display of a subscription user interface on the user terminal, wherein the user subscription includes the to-be-promoted official accounts and the description information corresponding to each of the to-be-promoted official accounts;

receiving a user selection of a first one of the to-be-promoted official accounts via the subscription user interface and user authorization information corresponding to the user-selected official account and sending the user-selected official account and the user authorization information to a corresponding official account server, wherein the official account server performs a subscription operation on the user-selected official account according to the user authorization information.

7. The computer server according to claim 6, wherein the plurality of operations further comprises:
for each of the multiple official accounts, extracting the description information of the official account from the corresponding official account server according to the authorization information of the official account and a predefined schedule, and updating the corresponding description information based on the extracted description information.

8. The computer server according to claim 6, wherein the plurality of operations further comprises:
obtaining an official account updating request, and updating, according to the official account updating request, the operator identifier and the multiple one to-be-promoted official account in the official account list corresponding to the promotion link.

9. The computer server according to claim 6, wherein the multiple official accounts in the official account list are associated with different public platforms.

10. The computer server according to claim 6, wherein the plurality of operations further comprises:
receiving a user selection of a second one of the to-be-promoted official accounts via the subscription user interface, wherein the first and second to-be-promoted official accounts belong to a same public platform.

11. A non-transitory computer readable storage medium storing a plurality of program instructions that, when executed by one or more processors of a computer server, cause the computer server to perform a plurality of operations including:
obtaining an association request, the association request comprising an operator identifier, an official account list, and authorization information of multiple official accounts in the official account list;

for each of the multiple official accounts, obtaining corresponding description information from a corresponding official account server according to the authorization information of the official account, wherein the description information includes a name of the official account, a profile photo of the official account, and content description of the official account;

associatively storing, for each of the multiple official accounts, the operator identifier, the official account, and the corresponding description information;

receiving a quick response code generation request, the quick response code generation request carrying the operator identifier and multiple to-be-promoted official accounts in the official account list;

in response to the quick response code generation request:
- generating a promotion link corresponding to the operator identifier, including aggregating the multiple official accounts into the promotion link; and
- converting the promotion link into a quick response code;

receiving an official account subscription request from a user terminal based on scanning and parsing of the quick response code by the user terminal;

in response to the subscription request, causing display of a subscription user interface on the user terminal, wherein the user subscription includes the to-be-promoted official accounts and the description information corresponding to each of the to-be-promoted official accounts;

receiving a user selection of a first one of the to-be-promoted official accounts via the subscription user interface and user authorization information corresponding to the user-selected official account and sending the user-selected official account and the user authorization information to a corresponding official account server, wherein the official account server performs a subscription operation on the user-selected official account according to the user authorization information.

12. The non-transitory computer readable storage medium according to claim 11, wherein the plurality of operations further comprises:
for each of the multiple official accounts, extracting the description information of the official account from the corresponding official account server according to the authorization information of the official account and a predefined schedule, and updating the corresponding description information based on the extracted description information.

13. The non-transitory computer readable storage medium according to claim 11, wherein the plurality of operations further comprises:
obtaining an official account updating request, and updating, according to the official account updating request, the operator identifier and the multiple to-be-promoted official account in the official account list corresponding to the promotion link.

14. The non-transitory computer readable storage medium according to claim 11, wherein the multiple official accounts in the official account list are associated with different public platforms.

* * * * *